(No Model.)
A. SNODDY.
WHEEL.
No. 447,797. Patented Mar. 10, 1891.
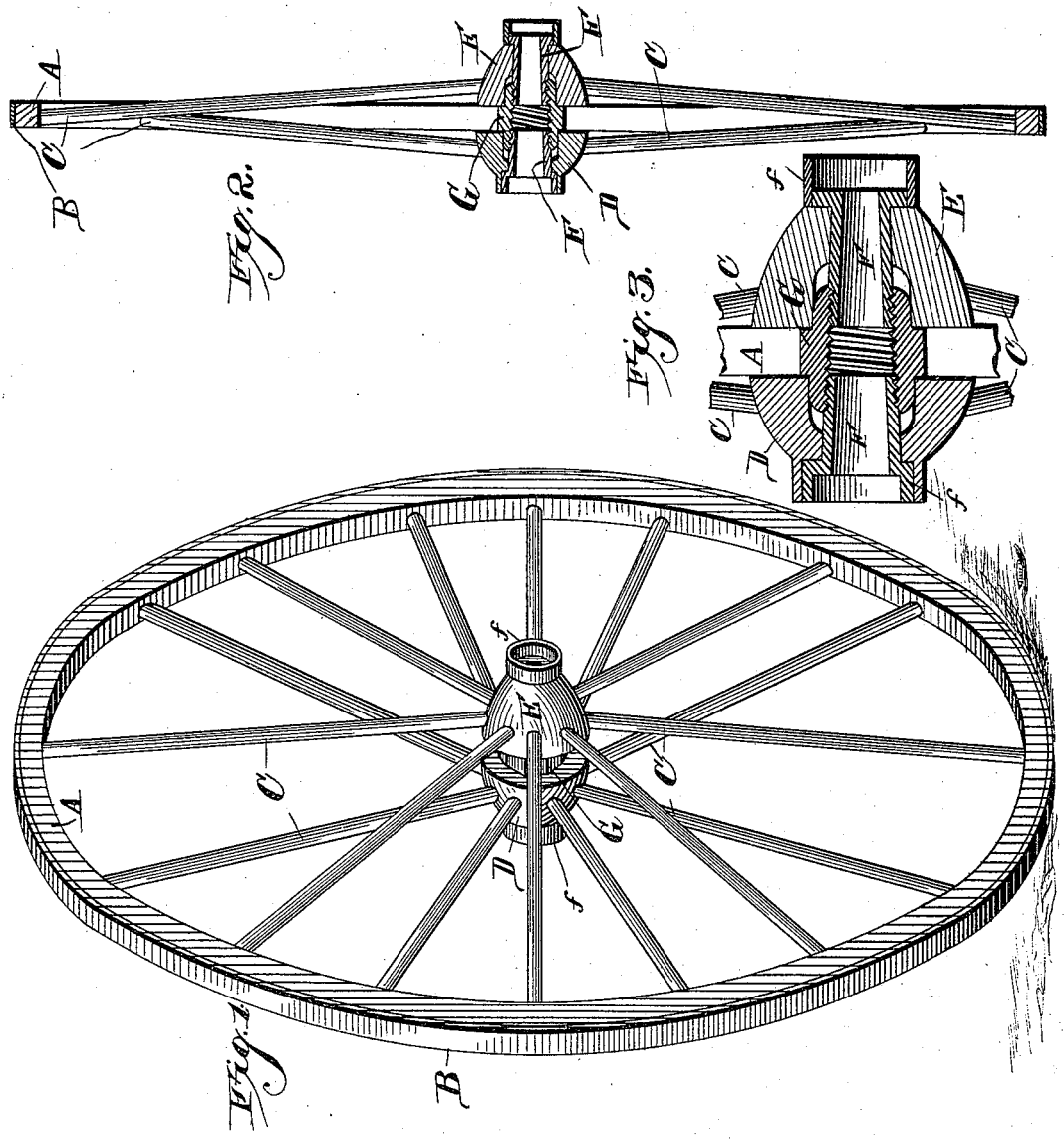
Witnesses
Henry G. Dieterich
N. W. Bishop.
By his Attorneys,
C. A. Snow & Co.
Inventor
Abner Snoddy,

UNITED STATES PATENT OFFICE.

ABNER SNODDY, OF BELLEFONTAINE, OHIO, ASSIGNOR TO MINNIE SNODDY, OF SAME PLACE.

WHEEL.

SPECIFICATION forming part of Letters Patent No. 447,797, dated March 10, 1891.

Application filed June 1, 1889. Renewed July 31, 1890. Serial No. 360,465. (No model.)

*To all whom it may concern:*

Be it known that I, ABNER SNODDY, a citizen of the United States, residing at Bellefontaine, in the county of Logan and State of Ohio, have invented a new and useful Wheel, of which the following is a specification.

My invention relates to improvements in wheels; and it consists in certain novel features hereinafter described and claimed.

In the accompanying drawings, Figure 1 is a perspective view of a wheel embodying my invention. Fig. 2 is a vertical section of the same. Fig. 3 is an enlarged section of the hub.

The felly A, tire B, and spokes C are all of the usual or any preferred construction. The hub is made in two sections D E, and metallic sleeves F are secured in the bores of the two sections and project inward from the same, the inner ends of said sleeves being threaded, as clearly shown, the inner end of one sleeve having a right-hand thread and the inner end of the other sleeve having a left-hand thread. The inner ends of the sleeves are engaged by the ends of a coupling collar or ring G, which is provided on its outer side at its center with a number of flat surfaces, which give it an angular outline and adapt it to be engaged by a wrench. The inner ends of the spokes are fitted in sockets in the members D E of the hub and radiate therefrom to the felly. The outer ends of the sleeves F have flanges or collars f, that bear against the outer ends of the hub-sections.

The construction and arrangement of the parts of my wheel being thus disclosed, the advantages of the same will, it is thought, be readily understood. The inner ends of the sleeves secured in the sections of the hub being provided with right and left hand threads, the hubs will be simultaneously moved in opposite directions, so as to be brought together or spread apart by rotating the coupling-collar in one direction. When the collar is rotated so as to spread the sections of the hub apart, the spokes will be loosened, so as to provide for shrinkage of the tire and the felly, and thereby prevent straining and breaking of the wheel; and when the collar is moved in the opposite direction the sections of the hub will be drawn together, so as to tighten the spokes and accommodate the wheel to the stretching of the tire, as will be readily understood.

It will thus be seen that the construction and arrangement shown and described provide a wheel in which the tire can be quickly and easily tightened or loosened according to the changes of the temperature, and in which the several parts are compactly arranged and protected from injury.

Having thus described my invention, what I claim, and desire to secure by Letters Patent, is—

The combination of the hub-sections D E, the sleeves F F, fitted in and extending through the bores of said hub-sections and provided at their outer ends with flanges f, bearing against the outer ends of said hub-sections, a right-and-left-hand-threaded nut adjusted upon the correspondingly-threaded inner ends of the sleeves and having an angular surface forming a wrench-seat, the rim, and the spokes having their inner ends seated in sockets in the hub-sections, all constructed and arranged substantially as set forth.

In testimony that I claim the foregoing as my own I have hereto affixed my signature in presence of two witnesses.

ABNER SNODDY.

Witnesses:
S. H. MILLER,
W. A. WEST.